United States Patent [19]

Spratt et al.

[11] Patent Number: 4,826,601
[45] Date of Patent: May 2, 1989

[54] SEWAGE TREATMENT METHOD

[75] Inventors: Marc M. Spratt, Kalispell; Geoffrey W. Harvey, White Fish; Thor A. Jackola, Kalispell, all of Mont.

[73] Assignee: Waste Treatment Technologies, Inc., Kalispell, Mont.

[21] Appl. No.: 892,758

[22] Filed: Aug. 1, 1986

[51] Int. Cl.[4] .............................................. C02F 3/30
[52] U.S. Cl. .................................. 210/610; 210/617; 210/620; 210/630; 210/631; 210/747; 210/903; 210/906
[58] Field of Search ............... 210/605, 610, 617, 620, 210/630, 631, 903, 906, 747

[56] References Cited

U.S. PATENT DOCUMENTS

| | | |
|---|---|---|
| 1,331,735 | 2/1920 | Wilson. |
| 3,202,285 | 8/1965 | Williams ............................ 210/195 |
| 3,741,393 | 6/1973 | Estes et al. ........................ 210/195 |
| 3,930,998 | 1/1976 | Knopp et al. ........................ 210/5 |
| 3,964,998 | 6/1976 | Barnard ......................... 210/903 X |
| 4,017,393 | 4/1977 | Foggett ............................ 210/101 |
| 4,094,773 | 6/1978 | Beaumont ...................... 210/630 X |
| 4,160,724 | 7/1979 | Laughton ....................... 210/903 X |
| 4,167,479 | 9/1979 | Besik .................................... 210/7 |
| 4,246,099 | 1/1981 | Gould et al. ........................ 210/603 |
| 4,279,753 | 7/1981 | Nielson et al. ...................... 210/605 |
| 4,325,823 | 4/1982 | Graham ............................... 210/86 |
| 4,454,259 | 6/1984 | Reischl et al. ................... 210/631 X |
| 4,495,056 | 1/1985 | Venardos et al. ............... 210/631 X |

OTHER PUBLICATIONS

Brandes, M., 1977, "Effective Phosphorous Removal by Adding Alum to Septic Tank", WPCF Journal 49:2285–2296.

Oregon Dept. Environmental Quality, 1982, Final Report on Oregon On-Site Experimental System Program, Salem, OR, p. 254.

U.S. EPA 1980, Design Manual–Onsite Wastewater Treatment & Disposal Systems, EPA 6254/1-80-012, 392 p.

Primary Examiner—Tom Wyse
Attorney, Agent, or Firm—James R. Young

[57] ABSTRACT

A method of treating sewage is disclosed that is particularly suitable for one or a small group of residential dwellings in environmentally sensitive areas. The raw sewage is flowed first into an aerobic first cell where it is aerated and forced into a highly aerobic condition where aerobic bacteria grow and consume phosphorus in a vigorous life cycle and then die. Substantial primary unloading of B.O.D., T.S.S., coliform, and phosphorous is accomplished in this first cell. The fluid from the first cell overflows into a second cell where additional sedimentary clarification occurs and it goes anaerobic. A third cell has an upwelling flow through a porous medium substrate where anaerobic bacteria converts nitrogen in nitrates and nitrites to nitrogen gas, and the fluid then flows into a fourth holding cell. The effluent in the holding cell can then be flowed intermittently through a sand filter that has a bed of dolemite for final removal of residual phosphorus before it flows into a drain field. Alum and methanol can be added to the raw sewage to, respectively, enhance initial flocculation and sedimentation in the first cell and to support anaerobic bacteria in the third cell.

34 Claims, 4 Drawing Sheets

SEWAGE TREATMENT METHOD

BACKGROUND OF THE INVENTION

1. Field of the Invention

This invention relates generally to sewage treatment systems and more specifically to an improved method and apparatus for treating domestic sewage in environmentally sensitive rural areas.

2. Description of the Prior Art

Treatment of domestic sewage is a perpetual problem for rural single family dwellings and small housing developments due to the necessity of maintaining safe, healthful environments and drinking water with only limited funds available to do so. Towns and cities have been able to treat sewage economically by utilizing taxes and fees collected from larger bases of industries, businesses, and individuals to provide common municipal treatment systems for entire communities. Because of such larger taxpayer and user bases, such municipal systems can be designed and constructed with varying degrees of sophistication, depending on the nature of the sewage produced, and provided with a staff of trained, professional operators, to meet stringent sewage treatment standards promulgated by governmental regulatory agencies. Further, in order to maintain a healthful environment and to preserve the safety of water resources, such standards have been made more stringent in recent years.

Unfortunately, such expensive, sophisticated sewage treatment facilities are not practical or feasible for rural single family dwellings or small housing developments. Yet, it is just as important to maintain health and safety standards in rural areas as it is in urban areas. To compound the problem, it is the desire of more and more people to construct their houses in rural and mountainous areas, which are aesthetically pleasing, but which unfortunately are also usually more environmentally sensitive. Mountainous areas in particular typically have relatively thin top soil layers over impervious rock substructures. Therefore, such soils have only very marginal capacity for absorbing wastewater and retaining it for sufficient periods to allow a natural purification process to be accomplished.

The conventional approach to domestic sewage systems in rural areas over the past several decades has been to empty the raw sewage into an anaerobic septic tank where anaerobic bacteria digest the sewage, breaking down solids and consuming some nitrates and nitrites in the process. Some sediment or sludge settles to the bottom of the septic tank, and liquid effluent overflows into an underground drain field where it seeps into the ground there is limited B.O.D., T.S.S., coliform bacteria, or phosphate treatment in such primary septic tank treatment, and the nitrogen treatment is inadequate. In rural agricultural areas where population densities are low and where top soil and subsoil layers are usually quite deep and sufficiently permeable to adsorb and retain the liquid effluent from septic tanks, such conventional septic systems have been satisfactory. With enough capacity and long enough retention time, the oxygen and bacteria in the soil eventually break down and treat the primary sewage components to safe levels.

However, in more environmentally sensitive areas, such as the desired mountainous home sites described above, it is now generally accepted that conventional primary septic system treatment is clearly inadequate. With thin layers of topsoil over impervious bedrock, the incompletely treated liquid effluent from a septic tank can easily pass essentially unaltered into the ground water or can surface and trickle as run-off into open streams, ponds, and lakes. Further, the untreated effluent can follow cracks and fractures in the bedrock to underground aquifers, thus fouling wells and water supplies of the residents in the area. Also, it has become more clear in recent years that substantial amounts of nitrogen and phosphorus are contained in domestic sewage. These components are damaging to the environment but are not effectively removed by conventional septic systems and can remain in the effluent to enter ground and surface waters. Therefore, while pressure to build houses in such rural, environmentally sensitive areas is increasing, the pressure on the environment is increasing even more rapidly. Some state and local governments are working to develop more stringent sewage treatment standards for such areas that conventional septic systems cannot meet and are even prohibiting further home building where there are no other sewage treatment alternatives available.

There have been some recent developments in improving septic tank systems. For example, the following U.S. patents utilize multiple-cell septic tanks and incorporate aerobic then anaerobic sequential treatment: U.S. Pat. No. 1,331,735, issued to J. Wilson; U.S. Pat. No. 3,930,998, issued to P Knopp et. al.; U.S. Pat. No. 4,374,730, issued to A. Braha et. al.; and U.S. Pat. No. 4,246,099, issued to M. Gould et. al. Further, the U.S. Pat. No. 4,279,753, issued to N. Nielson et. al. discloses an anaerobic/arobic/anaerobic/ then tertiary sequence. The U.S. Pat. No. 3,202,285, issued to F. Williams shows an anaerobic tank that separates sewage by densities followed by an aerobic tank. The U.S. Pat. No. 4,325,823, issued to Graham also shows an anaerobic/aerobic/settling tank sequence.

Other improvements have also been made in septic systems. For example, the U.S. Pat. No. 4,279,753, issued to Nielson et. al. discloses the use of alum to precipitate phosphates and a plurality of vertical plastic sheets in the aerobic tank to increase surface area for growth of aerobic microorganisms. The U.S. Pat. No. 3,930,998, issued to Knopp et. al. also discloses the use of methanol to support anaerobic bacteria.

While all of these innovations have been improvements to some extent over the conventional septic tank systems, none of them have been effective to achieve sufficient primary and secondary treatment of all the B.O.D., T.S.S., nitrogen, phosphate, and coliform bacteria components of the sewage to render it safe for such environmentally sensitive areas as described above. Therefore, in order for an individual or small group of persons to build homes on such environmentally sensitive sites, there was still, prior to this invention, an increasingly urgent need for a relatively small and inexpensive domestic sewage treatment system that could accomplish both primary and secondary treatment of all the B.O.D., T.S.S., nitrogen, phosphate, and coliform bacteria components to environmentally safe standards and which would be relatively easy and inexpensive to maintain over long periods of time.

SUMMARY OF THE INVENTION

Accordingly, it is a general object of this invention to provide a relatively simple residential sewage treatment system that is easy and inexpensive to construct and maintain, yet provides effective primary and secondary treatment of domestic sewage to acceptably safe standards.

A more specific object of the present invention is to provide a domestic sewage treatment system that maximizes removal of all B.O.D., T.S.S., coliform bacteria, nitrogen, and phosphate components to safe and acceptable levels or standards.

Additional objects, advantages, and novel features of the invention are set forth in part in the description that follows, and in part will become apparent to those skilled in the art upon examination of the following specification or may be learned by the practice of the invention. The objects and advantages of the invention may be realized and attained by means of the instrumentalities and in combinations pointed out in the appended claims.

To also achieve the foregoing and other objects in accordance with the purpose of the present invention, as embodied and broadly described herein, the method of this invention may generally comprise the steps of adding alum and methanol to the raw sewage and flowing it into a first cell, aerating the first cell, allowing aerobic bacteria to grow and consume phosphorus and other chemical reactions to occur to produce insoluble solids that remove B.O.D., T.S.S., coliform bacteria, nitrogen and phosphorus. The liquid is then overflowed into a second cell for additional settling of solids and for transition for aerobic to anaerobic conditions. Then the liquid is overflowed into a third cell where it upwells through a porous media in anaerobic condition to convert nitrates and nitrites to nitrogen gas. From the third cell, the liquid effluent is overflowed into a holding tank from where it can be pumped intermittently to a sand filter. In the sand filter, which is maintained in aerobic condition, the liquid effluent is flowed through a sand bed where additional reduction in B.O.D., T.S.S., coliform bacteria, and nitrogen occurs, and it is then flowed through a dolomite bed where residual soluble phosphorus reacts with the dolomite to produce insoluble solids of phosphorus for final phosphorus removal. The treated liquid effluent is then disposed in an underground drain field.

To achieve the foregoing and other objects in accordance with the purpose of the present invention as well as to facilitate the practice of the method of this invention, the apparatus of this invention may comprise the components required for the above-described method, including a four-cell septic tank with an aerobic/still well/anaerobic/holding tank sequence, including a submerged an aerator/mixer in the aerobic cell and an upwelling porous media impervious to suspended solids in the anaerobic cell. An intermittent sand filter has a layer of dolomite overlayed by a layer of sand overlayed by a layer of pea gravel, preferably buried in the ground with an equilibration system to maintain atmospheric pressure in the sand filter and to exhaust nitrogen and other gases. Water permeable membranes positioned over the pea gravel, between the pea gravel and the sand, and between the sand and the dolomite keep the materials from mixing and thereby maintaining the structural integrity of the sand filter. An alum and methanol injector is used to inject alum and methanol into the influent raw sewage, and an underground drain field approximately 50% smaller than conventional drain fields is used to dispose of treated effluent water.

BRIEF DESCRIPTION OF THE DRAWINGS

The accompanying drawings, which are incorporated in, and form a part of, the specification illustrate the preferred embodiment of the present invention, and together with the description, serve to explain the principles of the invention. In the drawings.

DETAILED DESCRIPTION OF THE PREFERRED EMBODIMENT

Figure 1:
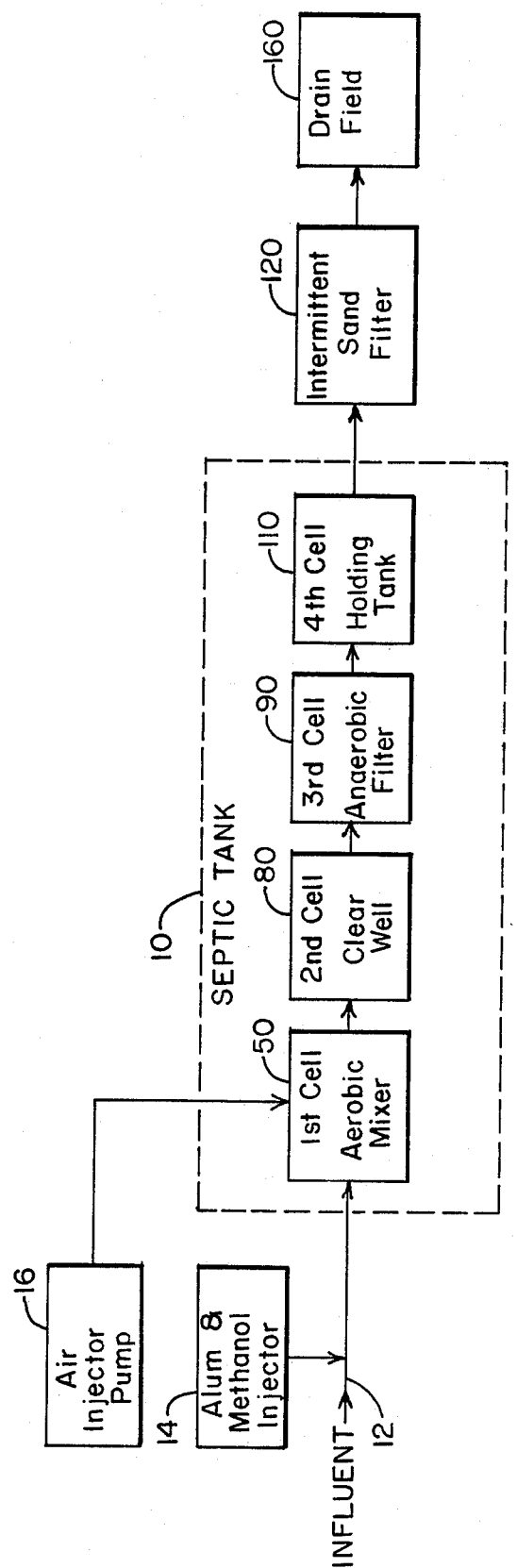
FIG. 1 is a flow diagram showing the relationships of the major components of the sewage treatment system of the present invention.

The sewage treatment system of the present invention is an enhanced septic system that includes an optimum combination of treatment steps and apparatus to achieve complete sewage treatment and removal of B.O.D. (Biological Oxygen Demand), T.S.S. (Total Suspended Solids), coliform bacteria, nitrogen, and phosphate components to acceptable levels or standards with a minimum of expense and operator maintenance. The major components of the system, as shown in FIG. 1, are a specially designed septic tank 10, a specially designed intermittent sand filter 120, and an essentially conventional drain field 160.

Raw sewage influent is collected from various sources in the house by a soil pipe (not shown) and directed to the septic tank 10 by a sewer pipe 12. An alum and methanol injector 14, preferably positioned inside the house, can be used to inject alum and methanol into the raw sewage for purposes to be described more thoroughly below. The alum and methanol injector is preferably comprised of a small reservoir (not shown) to hold a supply of liquid alum and methanol solution and a pump (not shown) for pumping the solution into the sewer pipe 12. The reservoir is preferably large enough to hold at least a 3-month supply of alum and methanol. An automatic timer (not shown) can be utilized to turn the pump on and off at predetermined time intervals as needed.

The septic tank 10 is comprised of four separate cells or chambers, 50, 80, 90, and 110, the functions and structures of which will be described more thoroughly below. However, for purposes of an overview, as shown in FIG. 1, before any anaerobic conversion, the raw sewage optionally, with alum and methanol, is first dumped into the first cell 50, which is kept in an aerobic condition with additional air provided by an air injector pump 16.

This additional air pumped into the first cell 50 forces and maintains the raw sewage into a highly aerobic condition wherein aerobic bacteria can thrive vigorously. After initial aerobic treatment in the first cell 50, the sewage flows into the second cell 80, which is a clear well, where it undergoes a transition from aerobic to anaerobic condition. The sewage then flows in an anaerobic condition into the third cell 90 for further digestion by anaerobic microorganisms. Finally, the primary treated sewage effluent flows into the fourth cell 110 which is essentially a holding tank.

When a predetermined volume of primary treated sewage is collected over a period of time in the holding tank 110, it is pumped to the intermittent sand filter 120 for secondary treatment, as will be described more thoroughly below. The sewage treatment, including removal of B.O.D., T.S.S., coliform bacteria, nitrogen, and phosphate to acceptable levels or standards, is complete by the time the effluent leaves the intermittent sand filter 120. Therefore, the drainfield 160, which is conventional in structure, essentially merely provides a vehicle or structure for dispersing the effluent liquid. Retention time in the drain field 160 or in the surrounding soil for further purification is not required, so there is no significant danger to ground or surface waters from effluent that might seep from the drain field 160.

Figure 2:
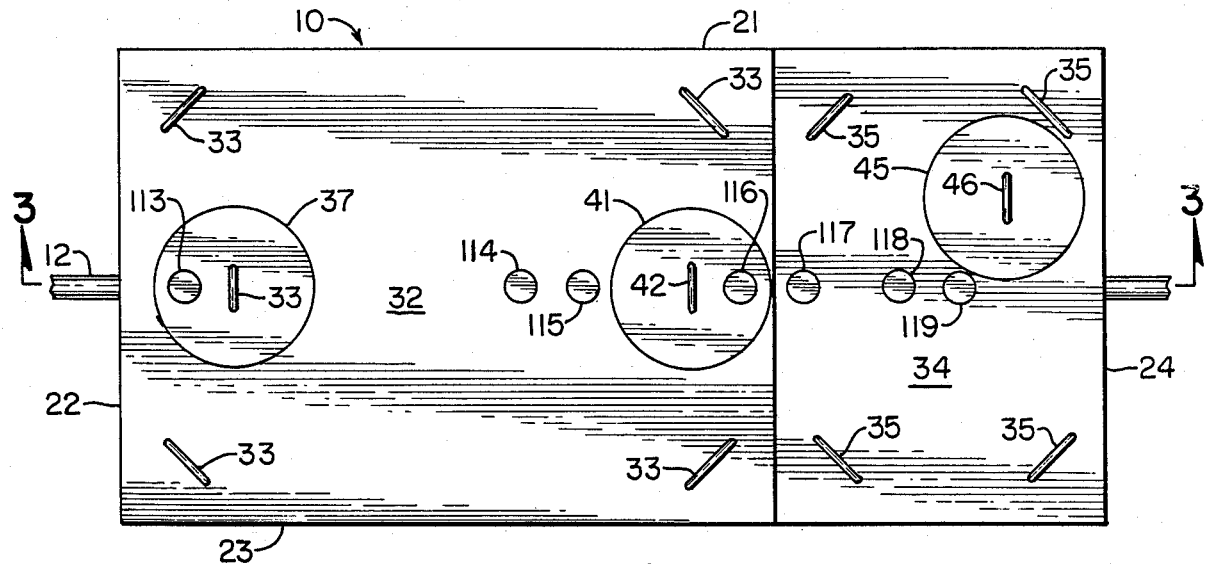
FIG. 2 is a plan view of the septic tank component of the present invention.
Figure 3:
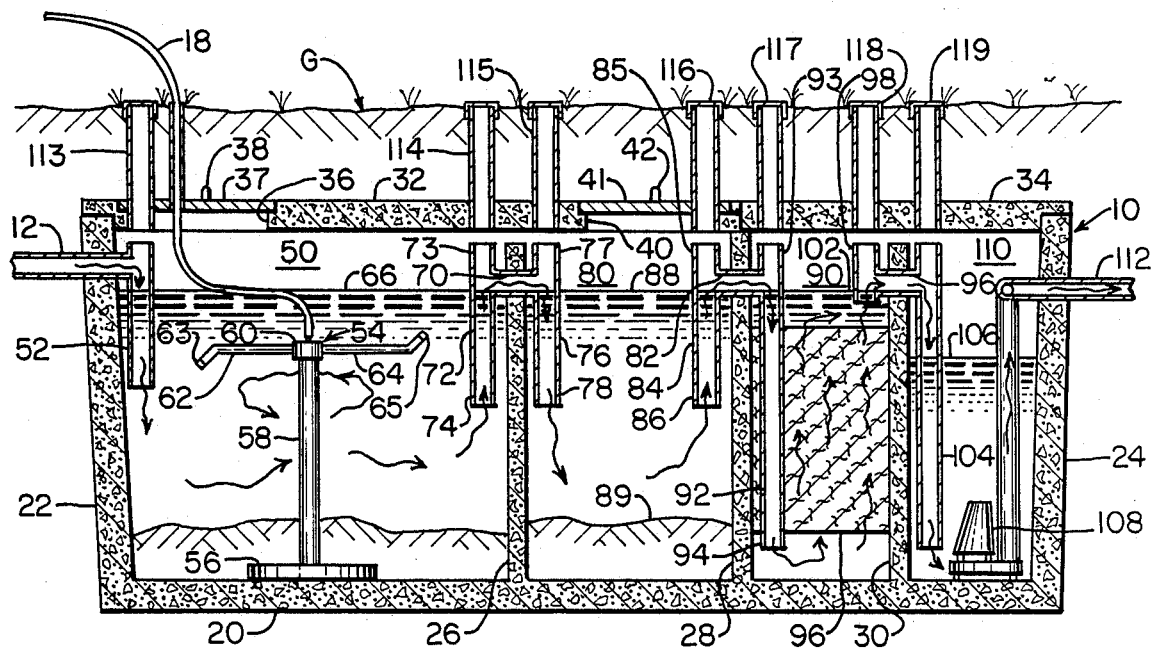
FIG. 3 is a cross sectional view in elevation of the septic tank of the present invention taken along line 3—3 of FIG. 2.

Referring now to FIGS. 2 and 3, the septic tank 10 is preferably comprised of a rectangular container fabricated with a substantially impervious material, such as concrete or fiberglass, that will not rust or deteriorate, since it is positioned in the ground G. It has a bottom panel 20 a four side panels 21, 22, 23, 24, the front 22 and rear 24 of which are shown in the cross section of FIG. 3. Interior partitions 26, 28, 30 divide the interior of the septic tank 10 into four separate chambers or cells 50, 80, 90, 110. Two covers 32, 34 close the top of the septic tank 10 and hold the ground G backfilled above. Access openings 36, 40 and covers 37, 41 with respective handles 38, 42 are provided for access to the interior cells 50, 80. Another opening (not shown) under cover 45 with handle 46 is provided for access to the pump 108 in cell 110. The covers 32, 34 are provided with handles 33, 35, respectively, to facilitate removal if that should ever be necessary.

Referring now primarily to FIG. 3, the raw sewage influent flowing from the house (not shown) through sewer pipe 12 is dumped into the first cell 50 through a vertical pipe 52. The progress of flow of the sewage through the system is indicated by a series of arrows. Domestic influent sewage typically includes B.O.D., T.S.S., and coliform bacteria. It also includes substantial quantities of nitrogen, primarily in the form of ammonia, with lesser amounts of organic nitrogen and traces of nitrate and nitrite, and it includes significant amounts of phosphorous, primarily in the orthophosphate form. Therefore, in addition to the expected B.O.D., T.S.S., and coliform bacteria removal, it has become clear in recent years that effective removal of nitrogen and phosphorus is also required.

The first cell 50 is maintained in aerobic condition, i.e., supports bacteria and other microorganisms that require oxygen to live, by injecting air through a submerged rotatable aerator 54 positioned in the first cell 50. The aerator 54 has a pedestal 58 mounted on a base 56 for supporting a rotatable connector 60. Two hollow arms 62, 64 protrude laterally from the connector 60 and have nozzles 63, 65 in their respective curved distal ends. Air from the air pump 16 (FIG. 1) is supplied through hose 18 to the rotatable connector 60. When air is provided in this manner, it escapes through the nozzles 63, 65 and drives the arms 62, 64 in a rotatable manner similar to the rotary motion of a lawn sprinkler, thereby aerating and mixing the sewage.

The primary removal of B.O.D., T.S.S., and coliform bacteria takes place in the aerobic environment of this first cell 50. For example, B.O.D., T.S.S., and coliform bacteria will react with $Al^{+3}$ ions. The ions cross link between negative charges on the organics to form an organic flocculate which precipitates. Removal efficiency should be in the range of 42% for B.O.D., 69% for T.S.S., and 96% for total coliform bacteria.

Further, the alum previously injected into the raw sewage combines with soluble phosphate in this first cell 50 to form insoluble aluminum phosphate. Phosphorus removal at this stage should be in the range of about 93%. Unused alum would also form insoluble aluminum hydroxide solids. The efficiency of aluminum removal is about 95 to 96 percent.

The aerobic bacteria in this first cell 50, in addition to B.O.D. consumption also consume phosphorus in a short, vigorous life cycle and then die. Since the cell 50 is aerated, further removal of B.O.D. occurs by oxidation. Also, sulfate reacts with calcium ions to form calcium sulfate, a salt of low solubility.

As a result, these cross-linking reactions cause the primary sedimentation of solids, including aluminum phosphates, aluminum hydroxide, calcium sulfate, and dead phosphorus-laden aerobic bacteria in this first cell 50. This sediment or sludge 68 eventually has to be pumped out of the septic tank, but a normal and economically sized cell 50 should hold a three to five year accumulation of sludge 68, so such cleaning is not a constant or major economic consideration or concern. Further cleaning and inspection tubes 113, 114 extend from the cover 32 over cell 50 to the surface of the ground and can be used to insert a cleaning suction hose into the cell 50 for convenient cleaning by conventional septic tank pumping equipment.

Also occurring in the aerobic environmental of this cell 50 is oxidation of ammonia to nitrates. These nitrates remain in the liquid for later removal by anaerobic bacteria in a different cell.

As additional sewage enters the cell 50 through pipe 52, the level of aerobically treated liquid 66 rises through vertical pipe 72 to horizontal crossover pipe 70, which extends from cell 50 through partition 26 into the second cell 80. At this level, the aerobically treated liquid 66 flows into cell 80. The lower end 74 of vertical pipe 72 is extended down under the surface of liquid 66 to prevent any flow of floating undigested solids of raw sewage into cell 80. The lower end 78 of vertical pipe 76 in cell 80 extends below the surface of liquid 88 in cell 80 to prevent cross flow of fluid on the surface directly from cell 50 to the third cell 90 when there is an influx of flow to cell 80.

Although the primary sedimentation of solids occurs in the first cell 50, the rotary air mixer 54 prevents complete sedimentation in cell 50. Therefore, the liquid that overflows from first cell 50 through the transfer pipe 70 into the second cell 80 does carry with it some suspended solids. Therefore, one of the primary purposes of the second cell 80 is to function as a clear well where the liquid 88 remains substantially stagnant so that sedimentation of the carried over suspended solids occurs. This clear well in the second cell 80 is effective to collect nearly all of the remaining solids. These settled solids 89 can be cleaned through tubes 115, 116 at about the same time intervals as cleaning of the solids 68 in the first cell 50, as discussed above.

Another purpose of the clear well in the second cell is to hold the liquid 88 for a sufficient period of time in a stagnant condition to eliminate residual oxygen. Therefore, there is a transition in the second cell 80 from aerobic to anaerobic condition, i.e., supporting bacteria and microorganisms that thrive in the absence of oxygen. As a result, the liquid 88 that overflows from the second cell 80 through transfer pipe 82 into the third cell 90 is in an almost completely anaerobic condition, which increases the efficiency of the anaerobic digestion in the third cell 90. A dwell time in cell 80 in the range of 4 to 8 hours is considered sufficient to complete sedimentation and to undergo substantial conversion from aerobic to anaerobic conditions.

The third cell 90 is an upwelling anaerobic clarifier. It is equipped with a porous plastic media 96, which provides a substrate of vastly increased surface area for the growth of anaerobic bacteria, while allowing the liquid 102 to seep upwardly therethrough in close contact with the surface area and the anaerobic bacteria growing thereon. In order to effect this upwelling flow, the bottom portion 94 of vertical inlet pipe 92 is extended from the crossover pipe 82 through partition 28 to a position near the bottom of cell 90. The outlet pipe 98, on the other hand, is near the top of the cell 90 where it connects to the crossover pipe 96. The porous plastic media substantially fills the cell 90 between the bottom inlet 94 and the top outlet 98.

Since sedimentation should be completed in the second cell 80, the sewage flowing into cell 90 should be all liquid. However, if the first cell 50 and second cell 80 are not cleaned of the settled solids 68, 89 when required, solids could flow over into the cell 90. If such solids could continue through the septic tank 10 to the intermittent sand filter 120, they would clog the sand filter 120 and damage it to the extent that it could not function. However, in this invention, the media 96 is impermeable to suspended solids, so such solids could not pass through the media 96. Therefore, they would plug the system under the media 96 and back the sewage into the first and second cells 50, 80. Such plugging would soon back into the sewer pipe 12 and into the house, thus alerting the user of the problem. While cleaning at proper intervals should avoid this problem, the required cleaning of the septic tank 10, including the media 96, if necessary, is much easier and less expensive than the alternative of having to replace the intermittent sand filter 120. Therefore, the media 96 serves the very beneficial secondary function of protecting the intermittent sand filter 120 from overflow of solids from the septic tank 10.

The anaerobic bacteria in cell 90 digest nitrates and nitrites and convert the nitrogen therein to free nitrogen gas ($N_2$). The methanol previously injected into the raw sewage is used as an energy substrate for the anaerobic bacteria. It along with any residual B.O.D. is therefore utilized in the process of reducing nitrate to nitrogen gas. Therefore, the primary nitrate removal occurs in this anaerobic third cell 90.

After this denitrification phase, the primary sewage treatment provided by the septic tank 10 according to this invention is substantially complete. The crossover pipe 96 and vertical pipe 104 then conduct the liquid 90 from the top of third cell 90 to the bottom of fourth cell 110. This fourth cell 110 functions primarily as a holding tank for accumulating the primary treated liquid 106 therein to a predetermined volume. In a system designed to handle one or two families, a volume in the range of about 200 gallons is satisfactory. When this predetermined volume of liquid 106 is accumulated in fourth cell 110, the sump pump 108 comes on automatically, triggered by an appropriate liquid level switch (not shown) to discharge the liquid 106 through effluent pipe 112 to the intermittent sand filter 120 for secondary treatment.

Figure 4:
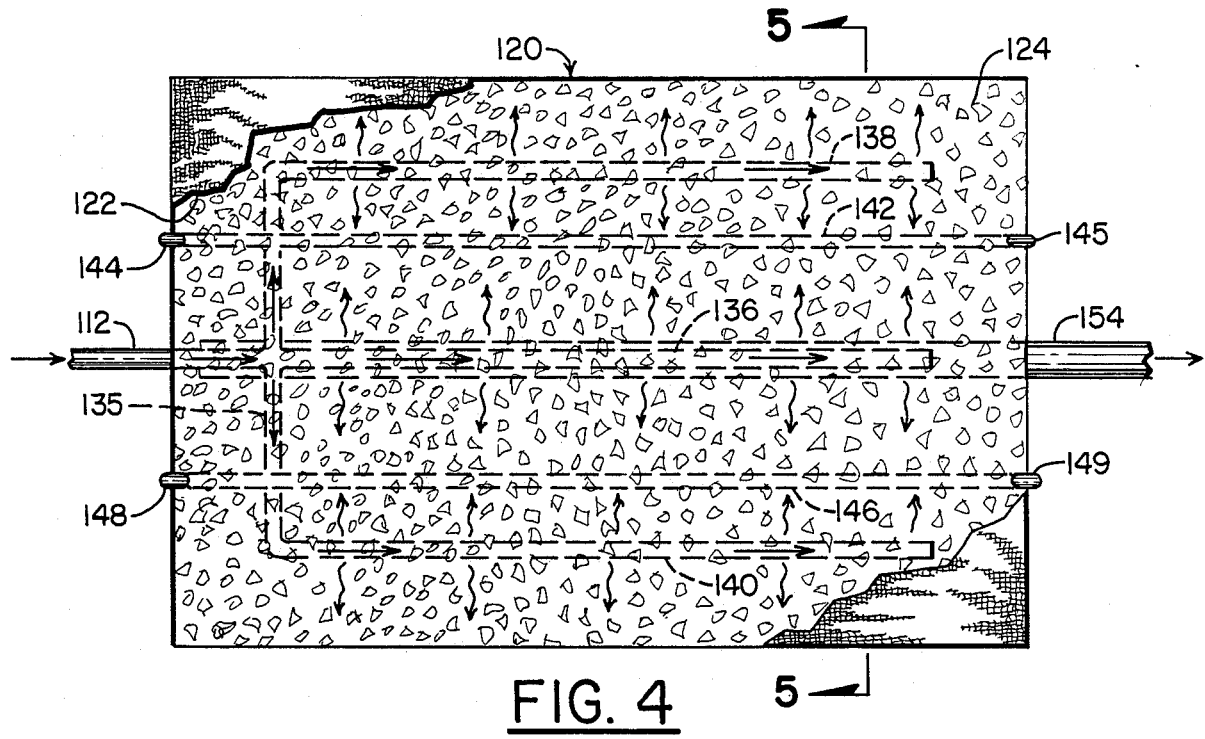
FIG. 4 is a plan view of the intermittent sand filter component of the present invention.
Figure 5:
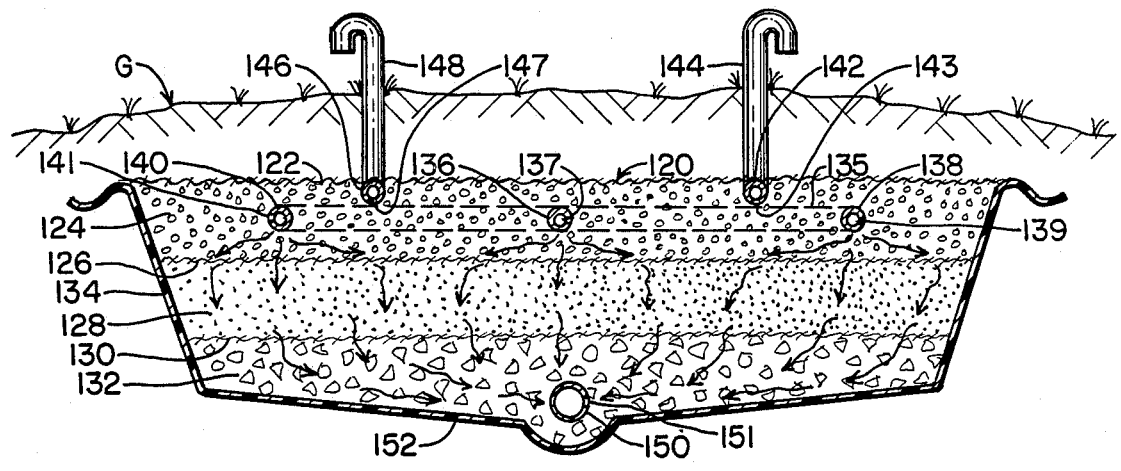
FIG. 5 is a cross sectional view in elevation of the intermittent sand filter taken along line 5—5 of FIG. 4.

The intermittent sand filter 120, as shown in FIGS. 4 and 5, accomplishes effective secondary treatment of the liquid effluent from the septic tank 10. It not only accomplishes additional B.O.D., T.S.S., coliform bacteria, and nitrogen removal, but is also is effective to remove residual phosphates, which has been a persistent problem in septic systems that has not been solved in this manner before this invention.

Figure 6:
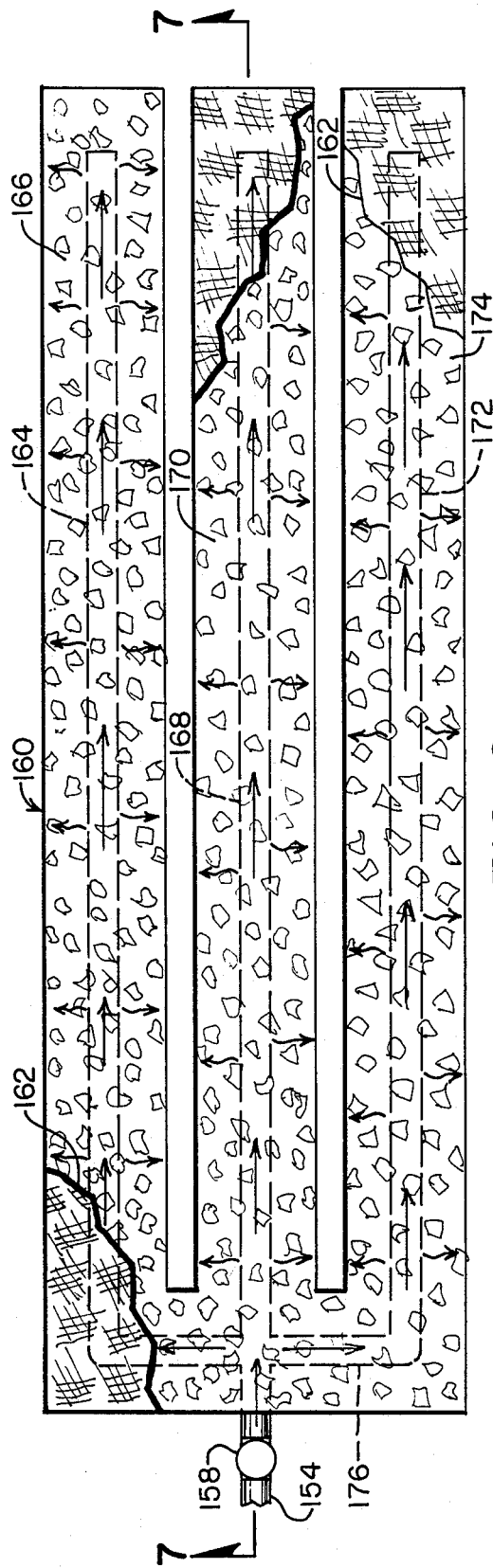
FIG. 6 is a plan view of the drain field component of the sewage treatment system of the present invention.

As shown in FIGS. 4 and 6, the intermittent sand filter 120 according to this invention is comprised primarily of three vertically stratified, horizontal layers of material buried under a layer of ground G. The top layer 124 is preferably a coarse, fairly uniformly sized aggregate, such as pea gravel. The intermediate layer 128 under the pea gravel layer 124 is preferably comprised of fine sand. The bottom layer 132 under the sand layer 128 is preferably a granulated dolomite material.

The three layers of material 124, 128, 132 are confined in the ground by an impermeable liner or pan 124, which can be a material such as a 20 mil plastic sheet. The bottom surface 152 is preferably sloped toward a substantially horizontal (with some grade allowed for gravity flow) drain pipe 154 embedded in the bottom portion of the dolomite layer 132. A top filter cloth membrane 122 is positioned over the pea gravel layer 124 to hold the ground G above out of the pea gravel. An intermediate filter cloth membrane is positioned between the pea gravel layer 124 and the fine sand layer 128 to maintain separation and structural integrity of those layers. Likewise, a bottom filter cloth membrane 130 keeps the fine sand layer 128 separated from the dolomite layer 132. The filter cloth membranes 122, 126, 130 are permeable to water, but soil, sand, gravel, and dolomite particles cannot pass through them.

The flow pipe 112 from the septic tank 10 is connected to a manifolded pattern of perforated distribution pipes 136, 138, 140 embedded in the pea gravel layer 124. The manifold pipe 135 connects the distribution pipes 136, 138, 140 to the flow pipe 112. Therefore, liquid pumped from the fourth cell 110 in the septic tank 10 is distributed through perforations 137, 139, 141 in respective pipes 136, 138, 140 throughout the pea gravel layer 124. The pea gravel layer 124 tends to effect an even hydraulic distribution of the liquid over the entire area of the intermittent sand filter, as indicated by the flow arrows in FIG. 4, for effective utilization of the entire filter area. A dose rate in the range of 1 to 2 gal./ft.$^2$ day is preferred. Then, as shown by the flow arrows in FIG. 5, the liquid percolates downwardly through the filter cloth 126 into the sand layer 128. From the sand layer, the liquid continues to percolate downwardly through filter cloth 130 into the dolomite layer.

As mentioned above, the pea gravel layer 124 causes uniform hydraulic loading over the area of the filter. Then, additional secondary B.O.D., T.S.S., and coliform bacteria removal occurs in the sand layer 128.

Finally, the residual soluble phosphorus that was not removed by the alum and by the aerobic bacteria in the septic tank 10 reacts with the dolomite and with impurities in the dolomite in layer 132 to form insoluble solids of phosphorus, such as hydroxylapatite. Such insoluble solids of phosphorus will eventually build up and coat the dolomite particles or granules, thus inhibiting the effectiveness of the dolomite layer for phosphorus removal. However, this process is slow, and, with the quantities involved, calculations indicate than an economically sized intermittent sand filter 120 constructed according to this invention, along with the septic tank 10 constructed according to this invention, should easily remain effective 15 or more years before rejuvenation or replacement of the dolomite is required. With such a long effective time, and the fact that dolomite is a relatively inexpensive material, such replacement should not be a significant economic burden, particularly in view of the fact that there is no other practical solution to the phosphate problem in septic systems for individual residences or small groups of residences.

Initial testing on a test installation designed for about 1,500 gal/day operating at about 38 percent capacity has shown the sewer treatment system of this invention to reduce phosphorus levels in domestic sewage to about 0.03 mg/l in the effluent from the intermittent sand filter 120. This result is exceptional when compared with the 1.0 mg/l maximum phosphorus standard commonly imposed on municipal sewage treatment systems. Also, the initial testing showed TKN (Total Kjeldahl Nitrogen, which includes nitrates, nitrides, and organic nitrogen) removal down to 0.3 mg/l, as compared with a maximum of 10 mg/l of TKN standard commonly imposed on municipal treatment systems. Further, T.S.S. and B.O.D. of the sewage were each reduced to about 4.0 mg/l, which is considered to be very low, compared to effluent from conventional septic systems, which usually run about 100 mg/l for B.O.D. and 100 mg/l for T.S.S. While these test results may vary with full loading and with passage of time, they are expected to remain well within acceptable standards.

Two equilibration tubes 142, 146 are shown in FIGS. 4 and 5 embedded in the pea gravel layer 124. A pair of vent risers 144, 145 on opposite ends of tube 142 extend above the ground G surface. Similarly, a pair of vent risers 148, 149 on opposite ends of tube 146 extend above the ground G. These equilibration tubes 142, 146 have a plurality of perforations 143, 147 along their respective lengths. Therefore, as the sand filter 120 is intermittently loaded and drained, air can be alternately exhausted from and drawn into the interior of the sand filter through the equilibration tubes 142, 146. Such intermittent loading and unloading helps to maintain an aerobic condition in the sand filter 120 and to rejuvenate it and keep it active. Also, nitrogen and other gases produced in both the septic tank 10 and in the sand filter 120 can vent to the atmosphere through the equilibration tubes 142, 146.

As also shown in FIGS. 4 and 5, the secondary treated liquid, which is substantially water, flows to the drain pipe 150 at the bottom of the dolomite layer 132. The liquid enters the drain pipe 150 through a plurality of perforations 151 along its length. The drain pipe 150 then conducts the treated liquid to the drain field 160 for final disposal.

The drain field 160 is essentially a conventional drain field structure having a manifolded plurality of perforated distribution pipes 164, 168, 172 embedded in corresponding rock beds 166, 170, 174 buried in the ground G. A layer 162 of straw, paper, or other suitable material can be positioned over the rock beds 166, 170, 174 to keep the ground above from filtering into and clogging the rock beds. Liquid effluent from the sand filter 120 is conducted via pipe 154 to manifold 176, where it is distributed to the pipes 164, 168, 172. It then flows out the perforations, as at 169 in pipe 168, and is distributed evenly through the rock beds from where it can seep into the ground.

Figure 7:
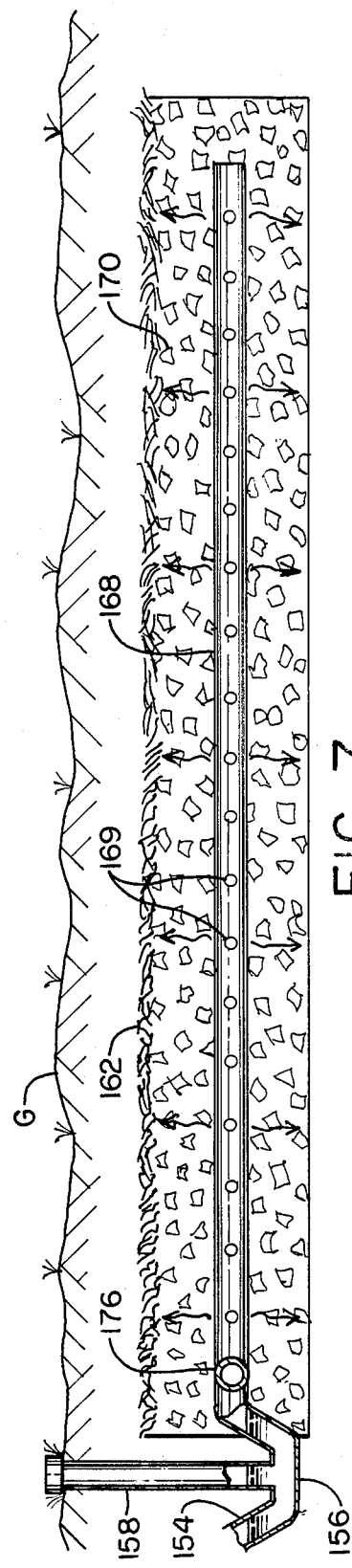
FIG. 7 is a cross sectional view in elevation of the drain field taken along line 7—7 of FIG. 6.

The primary and secondary treatment is essentially completed in the septic tank 10 and intermittent sand filter 120, so the drain field 160 in this invention is relegated to the role of water disposal. However, some further reduction of all parameters except nitrogen can be expected in the drain field As shown in FIG. 7, a trap 156 and sample riser 158 can be provided between the intermittent sand filter 120 and the drain field 160 for sampling the effluent liquid for testing.

For purposes of example and not limitation, a 1,500 gal/day installation, the cells in the septic tank 10 can be designed so that the first cell 50 has a capacity in the range of about 650 to 750 gal, the second cell 80 has a capacity in the range of about 300 to 400 gal, the third cell 90 can have a capacity in the range of about 200 to 300 gal, and the fourth cell 110 can have a capacity in the range of about 100 to 300 gal. The surface area of the intermittent sand filter can be sized to receive a dose rate of about 1 to 3 gal/ft.$^2$/day. Alum can be injected in the range of 200 to 300 ml/day 50% solution, and methanol can be injected in the range of about 150 to 200 ml/day 50% solution.

The foregoing is considered as illustrative only of the principals of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention as defined by the claims which follow.

The embodiments of the invention in which exclusive property rights or privileges are claimed are defined as follows:

1. The method of treating sewage, comprising the steps of:
   flowing raw influent sewage into a first cell; and, before allowing the raw influent sewage to go into an anaerobic condition, aerating the raw sewage in the first cell to force and maintain it into an even more highly aerobic condition, and allowing sufficient dwell time therein for aerobic bacteria to grow and consume phosphorus and then die, for B.O.D., T.S.S., and coliform bacteria to form organic precipitates, and for the solids and precipitates to substantially settle out of the liquid in said first cell;
   overflowing the remaining aerobic liquid and any remaining unsettled solids from said first cell into a second cell and allowing sufficient essentially stagnant dwell time in said second cell for substantially all of the remaining solids to settle out of the liquid in said second cell and for the sewage to undergo a conversion from aerobic to substantially anaerobic condition in said second cell;
   overflowing the anaerobic liquid from the second cell into the bottom portion of a third cell, and flowing the anaerobic liquid upwardly through a porous media substrate in said third cell having anaerobic microorganisms growing on the surfaces and in the pores of the substrate and allowing sufficient dwell time in the third cell for the anaerobic microoganisms therein the convert most of the nitrogen in nitrates and nitrites in the liquid to nitrogen gas;

overflowing the effluent liquid from the third cell into a fourth cell; and intermittently removing accumulated effluent liquid from the fourth cell.

2. The method of claim 1, including the steps of adding alum to the raw sewage flowing into said first cell, an allowing sufficient dwell time in said first cell for the B.O.D., T.S.S., and coliform bacteria to react with positive charged ionic aluminum from the alum to form flocculents, for alum to combine with soluble phosphates to form insoluble aluminum phosphate precipitate, and for the flocculents and precipitates to substantially settle out of the liquid in said first cell.

3. The method of claim 1, including the step of adding methanol to the raw sewage flowing into said first cell for supporting anaerobic bacteria growth in said third cell.

4. The method of treating sewage, comprising the steps of:

flowing the raw influent sewage into a first cell;

aerating the raw sewage in the first cell to force it into aerobic condition, and allowing sufficient dwell time therein for aerobic bacterial to grow and consume phosphorus and then die, for B.O.D., T.S.S., and coliform bacteria to form organic precipitates, and for the solids and precipitates to substantially settle out of the liquid in said first cell;

overflowing the remaining liquid and any remaining unsettled solids from said first cell into a second cell and allowing sufficient essentially stagnant dwell time in said second cell for substantially all of the remaining solids to settle out of the liquid in said second cell and for the sewage to undergo a conversion from aerobic to substantially anaerobic condition in said second cell;

overflowing the anaerobic liquid from the second cell into the bottom portion of a third cell, and flowing the anaerobic liquid upwardly through a porous media substrate in said third cell having anaerobic microorganisms growing on the surfaces and in the pores of the substrate and allowing sufficient dwell time in the third cell for the anaerobic microorganisms therein to convert most of the nitrogen in nitrates and nitrites in the liquid to nitrogen gas;

overflowing the effluent liquid from the third cell into a fourth cell;

intermittently removing accumulated effluent liquid from the fourth cell; and exposing the effluent liquid removed from the fourth cell to dolomite for a sufficient period of time for residual soluble, dissolved phosphorus in the effluent liquid to react with the dolomite to form insoluble solids of phosphorus.

5. The method of claim 4, including the step of intermittently flowing the effluent liquid removed from the fourth cell through a bed of sand in aerobic condition and allowing sufficient dwell time in the sand to allow additional secondary B.O.D., T.S.S., and coliform bacteria removal from the effluent liquid and to allow additional denitrification of the effluent liquid.

6. The method of claim 5, including the steps of positioning said sand bed over said dolomite and intermittently flowing said effluent liquid from said fourth cell over the sand bed and allowing it to percolate downwardly through the sand bed and into the dolomite.

7. The method of claim 6, including the step of distributing the effluent liquid over the sand bed by positioning a bed of pea gravel over the sand bed and flowing the effluent liquid from said fourth cell into said bed of pea gravel.

8. The method of claim 7, including the step of positioning a first water-permeable membrane between the bed of pea gravel and the sand bed and positioning a second water-permeable membrane between the sand bed and the dolomite.

9. The method of claim 6, including the steps of collecting the liquid effluent after it flows through the dolomite and flowing it into an underground drain field for disposal.

10. The method of claim 6, including the step of flowing the effluent liquid through the sand bed and dolomite at a dose rate in the range of 1 to 2 gal/ft.$^2$/day.

11. The method of treating sewage, comprising the steps of:

adding alum and methanol to the raw sewage and flowing the raw influent sewage into a first cell;

aerating the sewage in the first cell to force it into an aerobic condition, and allowing sufficient dwell time therein for aerobic bacteria to grow and consume phosphorus and then die, for B.O.D., T.S.S., and coliform bacteria to react with positive charged aluminum ions and cross-link with negative charges on the organics to form organic flocculents, and for alum to combine with soluble phosphates to form insoluble precipitates, and for the solids, flocculents and any precipitates to substantially settle out of the liquid;

overflowing the remaining liquid and any remaining unsettled solids into a second cell and allowing sufficient essentially stagnant dwell time therein for substantially all of the remaining solids to settle out of the liquid and for the sewage to undergo a conversion from aerobic to substantially anaerobic condition;

overflowing the anaerobic liquid from the second cell into the bottom portion of a third cell, and flowing the anaerobic liquid upwardly through a porous media substrate having anaerobic microorganisms growing on the surfaces and in the pores of the substrate and allowing sufficient dwell time in the third cell for the anaerobic microorganisms therein the convert nitrogen in nitrates and nitrites in the liquid to nitrogen gas;

overflowing the effluent liquid from the third cell into a fourth cell and intermittently removing accumulated effluent liquid from the fourth cell;

flowing said effluent liquid through a bed of sand and allowing sufficient dwell time in the sand to allow additional secondary B.O.D., T.S.S., and coliform bacteria removal from the effluent liquid and to allow additional denitrification of the effluent liquid; and exposing said effluent liquid to dolomite for a sufficient period of time for residual dissolved phosphorus in the effluent liquid to react with the dolomite to form insoluble solids of phosphorus.

12. The method of claim 11, including the steps of positioning said sand bed over said dolomite and intermittently flowing said effluent liquid from said fourth cell over the sand bed and allowing it to percolate downwardly through the sand bed and into the dolomite.

13. The method of claim 12, including the step of distributing the effluent liquid over the sand bed by positioning a bed of pea gravel over the sand bed and flowing the effluent liquid from said fourth cell into said bed of pea gravel.

14. The method of claim 13, including the step of positioning a first water-permeable membrane between the bed of pea gravel and the sand bed and positioning a second water-permeable membrane between the sand bed and the dolomite.

15. The method of claim 12, including the steps of collecting the liquid effluent after it flows through the dolomite and flowing it into an underground drain field for disposal.

16. The method of claim 11, including the steps of allowing dwell time in said first cell in the range of about 8 to 16 hours, dwell time in said second cell in the range of about 3 to 8 hours, and dwell time in said third cell of about 2 to 6 hours.

17. The method of claim 12, including the step of flowing the effluent liquid through the sand bed and dolomite at a dose rate in the range of 1 to 2 gal/ft.$^2$/day.

18. The method of claim 11, including the step of aerating and mixing the sewage in the first cell by forcing air into a pair of arms rotatably mounted in a plane of rotation on a pedestal in the first cell, with said pedestal forming an axis of rotation perpendicular to the plane of rotation of the arms and with said pedestal and said arms being positioned to remain below the surface of the sewage, with the arms extending diametrically opposite one another with respect to the axis of rotation, and ejecting the air forced through the arms from the distal ends of the arms at an angle, causing rotation of the arms about said axis of rotation.

19. The method of treating sewage, comprising the steps of:
flowing the raw influent sewage into a first cell; maintaining the influent in a highly concentrated aerobic condition; aerating the sewage in the first cell and allowing sufficient dwell time therein for aerobic bacteria to grow and consume phosphorus and then die, and for the solids, to substantially settle out of the liquid;
overflowing the remaining liquid and any remaining unsettled solids into a second cell and allowing sufficient essentially stagnant dwell time therein for substantially all of the remaining solids to settle out of the liquid and for the sewage to undergo a conversion from aerobic to substantially anaerobic condition;
overflowing the anaerobic liquid from the second cell into the bottom portion of a third cell, and flowing the anaerobic liquid upwardly through a porous media substrate having anaerobic microorganisms growing on the surfaces and in the pores of the substrate and allowing sufficient dwell time in the third cell for the anaerobic microorganisms therein the convert nitrogen in nitrates and nitrites in the liquid to nitrogen gas;
overflowing the effluent liquid from the third cell into a fourth cell;
intermittently removing accumulated effluent liquid from the fourth cell and flowing said effluent liquid through a bed of sand and allowing sufficient dwell time in the sand to allow additional secondary B.O.D., T.S.S., and coliform bacteria removal from the effluent liquid and to allow additional denitrification of the effluent liquid; and
exposing said effluent liquid to dolomite for a sufficient period of time for residual dissolved phosphorus in the effluent liquid to react with the dolomite to form insoluble solids of phosphorus.

20. The method of claim 19, including the steps of:
adding alum to the sewage in said first cell as an accelerant; and
aerating the sewage in the first cell and allowing sufficient dwell time therein for aerobic bacteria to grow and consume phosphorus and then die, got B.O.D., T.S.S., and coliform bacteria to react with positive-charge ionic aluminum cross-linked with negative charges on organics to form organic flocculants, and for alum to combine with soluble phosphates to form insoluble aluminum phosphate, and for the solids, flocculants and any precipitates to substantially settle out of the liquid.

21. The method of claim 19, including the steps of positioning said sand bed over said dolomite and intermittently flowing said effluent liquid from said fourth cell over the sand bed and allowing it to percolate downwardly through the sand bed and into the dolomite.

22. The method of claim 21, including the step of distributing the effluent liquid over the sand bed by positioning a bed of pea gravel over the sand bed and flowing the effluent liquid from said fourth cell into said bed of pea gravel.

23. The method of claim 22, including the step of positioning a first water-permeable membrane between the bed of pea gravel and the sand bed and positioning a second water-permeable membrane between the sand bed and the dolomite.

24. The method of claim 21, including the steps of collecting the liquid effluent after it flows through the dolomite and flowing it into an underground drain field for disposal.

25. The method of claim 20, including the steps of allowing dwell time in said first cell in the range of about 8 to 16 hours, dwell time in said second cell in the range of about 3 to 8 hours, and dwell time in said third cell of about 2 to 6 hours.

26. The method of claim 21, including the step of flowing the effluent liquid through the sand bed and dolomite at a dose rate in the range of 1 to 2 gal/ft.$^2$/day.

27. The method of claim 19, including the step of adding methanol to the sewage at least as soon as the sewage reaches the bottom portion of the third cell.

28. The method of claim 19, including the step of aerating and mixing the sewage in the first cell by forcing air into a pair of arms rotatably mounted in a plane of rotation on a pedestal in the first cell, with said pedestal forming an axis of rotation perpendicular to the plane of rotation of the arms and with said pedestal and said arms being positioned to remain below the surface of the sewage, with the arms extending diametrically opposite one another with respect to the axis of rotation, and ejecting the air forced through the arms from the distal ends of the arms at an angle, causing rotation of the arms about said axis of rotation.

29. The method of treating sewage, comprising the steps of:
treating the sewage to provide primary removal of B.O.D., T.S.S., coliform bacteria, phosphorous, and nitrogen and collecting the primary treated effluent liquid in a holding chamber;

intermittently flowing said primary treated effluent through a bed of sand in aerobic condition and allowing sufficient dwell time in the sand to allow additional secondary B.O.D., T.S.S., and coliform bacteria removal from the effluent liquid and to allow additional denitrification of the effluent liquid; and exposing said effluent liquid to dolomite for a sufficient period of time for residual soluble dissolved phosphorous in the effluent liquid to react with the dolomite to form insoluble solids of phosphorous.

30. The method of treating sewage, comprising the steps of:

treating the sewage to provide primary removal of B.O.D., T.S.S., coliform bacteria, phosphorous, and nitrogen and collecting the primary treated effluent liquid in a holding chamber; and exposing said effluent liquid to dolomite for a sufficient period of time for residual soluble dissolved phosphorous in the effluent liquid to react with the dolomite to form insoluble solids of phosphorus.

31. The method of treating sewage, comprising the steps of:

flowing the sewage into a first cell;

aerating the sewage in the first cell to force the sewage into aerobic condition in said first cell an allowing sufficient dwell time in said first cell for aerobic bacteria to grow and consume phosphorous and die, for B.O.D., T.S.S., and coliform bacteria to form precipitates, and for the dead, phosphorous-laden bacteria, solids, and precipitates to substantially settle out of the liquid;

flowing the remaining liquid and any remaining unsettled solids into a second cell and allowing sufficient essentially stagnant dwell time for substantially all of the remaining solids to settle out of the liquid and for the sewage to undergo a conversion from aerobic to substantially anaerobic condition;

flowing the anaerobic liquid from the second cell into the bottom portion of the third cell, and flowing the anaerobic liquid upwardly through a porous media substrate having anaerobic microorganisms growing on the surfaces and in the pores of the substrates and allowing sufficient dwell time in the third cell for the anaerobic microorganisms therein to convert nitrogen in nitrates and nitrites in the liquid to nitrogen gas; and intermittently flowing the effluent liquid removed from the fourth cell through a bed of sand and allowing sufficient dwell time in the sand to allow additional secondary B.O.D., T.S.S., and coliform bacteria removal from the effluent liquid and to allow additional denitrification of the effluent liquid.

32. The method of claim 31, including the step of contracting the liquid effluent with dolomite for a sufficient period of time for residual soluble phosphorus in the liquid to react with the dolomite to form insoluble solids of phosphorous.

33. The method of treating sewage, comprising the steps of:

flowing the raw influent sewage into a first cell;

aerating the raw sewage in the first cell to force it into aerobic condition, and allowing sufficient dwell time therein in the range of about 8 to 16 hours for aerobic bacteria to grow and consume phosphorus and then die, for B.O.D., T.S.S., and coliform bacteria to from organic precipitates, and for the solids and precipitates to substantially settle out of the liquid in said first cell;

overflowing the remaining liquid and any remaining unsettled solids from said first cell into a second cell and allowing sufficient essentially stagnant dwell time in the range of about 3 to 8 hours in said second cell for substantially all of the remaining solids to settle out of the liquid in said second cell and for the sewage to undergo a conversion from aerobic to substantially anaerobic condition in said second cell;

overflowing the anaerobic liquid from the second cell into the bottom portion of a third cell, and flowing the anaerobic liquid upwardly through a porous media substrate in said third cell having anaerobic microorganisms growing on the surfaces and in the pores of the substrate and allowing sufficient dwell time in the range of about 2 to 6 hours in the third cell for the anaerobic microorganisms therein to convert most of the nitrogen in nitrates and nitrites in the liquid to nitrogen gas;

overflowing the effluent liquid from the third cell into a fourth cell; and intermittently removing accumulated effluent liquid from the fourth cell.

34. The method of treating sewage, comprising the steps of:

flowing the raw influent sewage into a first cell;

aerating the raw sewage in the first cell to force it into aerobic condition by forcing air into a pair of arms rotatably mounted in a plane of rotation on a pedestal in the first cell, with said pedestal forming an axis of rotation perpendicular to the plane of rotation of the arms and with said pedestal and said arms being positioned to remain submerged below the surface of the sewage, with the arms extending diametrically opposite one another with respect to the axis of rotation, and ejecting the air from the distal ends of the arms at an angle to the arms, causing rotation of the arms about said axis of rotation for simultaneously mixing and aerating the sewage;

allowing sufficient dwell time in said first cell for aerobic bacteria to grow and consume phosphorus and then die, for B.O.D., T.S.S., and coliform bacteria to form organic precipitates, and for the solids and precipitates to substantially settle out of the liquid in said first cell;

overflowing the remaining liquid and any remaining unsettled solids from said first cell into a second cell and allowing sufficient essentially stagnant dwell time in said second cell for substantially all of the remaining solids to settle out of the liquid in said second cell and for the sewage to undergo a conversion from aerobic to substantially anaerobic condition in said second cell;

overflowing the anaerobic liquid from the second cell into the bottom portion of a third cell, and flowing the anaerobic liquid upwardly through a porous media substrate in said third cell having anaerobic microoganisms growing on the surfaces and in the pores of the substrate and allowing sufficient dwell time in the third cell for the anaerobic microorganisms therein the convert most of the nitrogen in nitrates and nitrites in the liquid to nitrogen gas;

overflowing the effluent liquid from the third cell into a fourth cell; and intermittently removing accumulated effluent liquid from the fourth cell.

* * * * *

UNITED STATES PATENT AND TRADEMARK OFFICE
CERTIFICATE OF CORRECTION

PATENT NO. : 4,826,601

DATED : May 2, 1989

INVENTOR(S) : Marc Spratt, et al.

It is certified that error appears in the above-identified patent and that said Letters Patent is hereby corrected as shown below:

In Column 1, line 53, change "ground there" to --ground. There--
In Column 2, line 32, between "tertiary" and "sequence" add --treatment--.
In Column 3, line 18, delete "also".
In Column 3, line 29, change "for" to --from--.
In Column 3, line 44, between "To" and "achieve" add --also--.
In Column 4, line 59, change "optionally," to --, optionally--.
In Column 5, line 26, change "a" to --and--.
In Column 9, line 27, change "10mg/1" to --10mg/l--.
In Column 9, line 30, change "4.0mg/1" to --4.0mg/l--.
In Column 12, line 47, change "the convert" to --to convert--.
In Column 14, line 12, change "got" to --for--.
In Column 16, line 62, change "the convert" to --to convert--.

Signed and Sealed this

Twentieth Day of March, 1990

Attest:

JEFFREY M. SAMUELS

Attesting Officer

Acting Commissioner of Patents and Trademarks